United States Patent [19]

Tischendorf et al.

[11] Patent Number: 5,052,123
[45] Date of Patent: Oct. 1, 1991

[54] DRYING AND HEATING OF POLYAMIDE GRANULES

[75] Inventors: Klaus J. Tischendorf, Weisenheim; Manfred Liebscher, Worms; Farid Rizk, Neuhofen; Franz Zahradnik, Ludwigshafen, all of Fed. Rep. of Germany

[73] Assignee: BASF Aktiengesellschaft, Ludwigshafen, Fed. Rep. of Germany

[21] Appl. No.: 547,304

[22] Filed: Jul. 3, 1990

[30] Foreign Application Priority Data

Jul. 13, 1989 [DE] Fed. Rep. of Germany ....... 3923061

[51] Int. Cl.⁵ .............................................. F26B 7/00
[52] U.S. Cl. .......................................... 34/17; 34/36; 34/65; 34/168
[58] Field of Search ..................... 34/64–67, 34/174, 168, 172, 165, 13, 20, 36, 166

[56] References Cited

U.S. PATENT DOCUMENTS

| 759,527 | 5/1904 | Irwin | 34/64 |
| 3,266,165 | 8/1966 | Apostle et al. | 34/65 |
| 3,325,913 | 6/1967 | Maus | 34/174 |
| 4,092,784 | 6/1978 | Dietrich et al. | 34/65 |
| 4,439,933 | 4/1984 | Dietrich et al. | 34/25 |

Primary Examiner—James C. Yeung
Attorney, Agent, or Firm—Keil & Weinkauf

[57] ABSTRACT

Polyamide granules are dried and heated by feeding a suspension of granules in water into a sieve (1), where the bulk of the water is removed, and then into a tower dryer (10), where they are deposited in bed form and then freed of the remaining water while moving in plug flow under the force of gravity with a counter-current inert gas stream at from 70° to 200° C. The tower dryer possesses an inlet at the top (11) and outlet at the bottom (34) for the granules and also feed lines (20, 22, 31) for the inert gas. To achieve a uniform degree of drying of the granules, the inert gas is divided on entry into the tower dryer at a point between the drying zone and the heating zone into a stream which flows radially inward into the bed of granules on the one hand and a stream which flows radially inward and outward on the other. In this way the inert gas is distributed particularly uniformly and the granules are dryable in a very short drying zone down to a water content of 0.0001 kg of water/kg of polymer. The lower, conically tapered area of the tower dryer—bin 30—ensures a uniform rate of descent of the granules and hence a uniform solid-phase condensation with a favorable molecular weight distribution. The tower dryer (10) is followed by a fluidized bed cooler (41) in which the granules are cooled with air to <50° C.

4 Claims, 1 Drawing Sheet

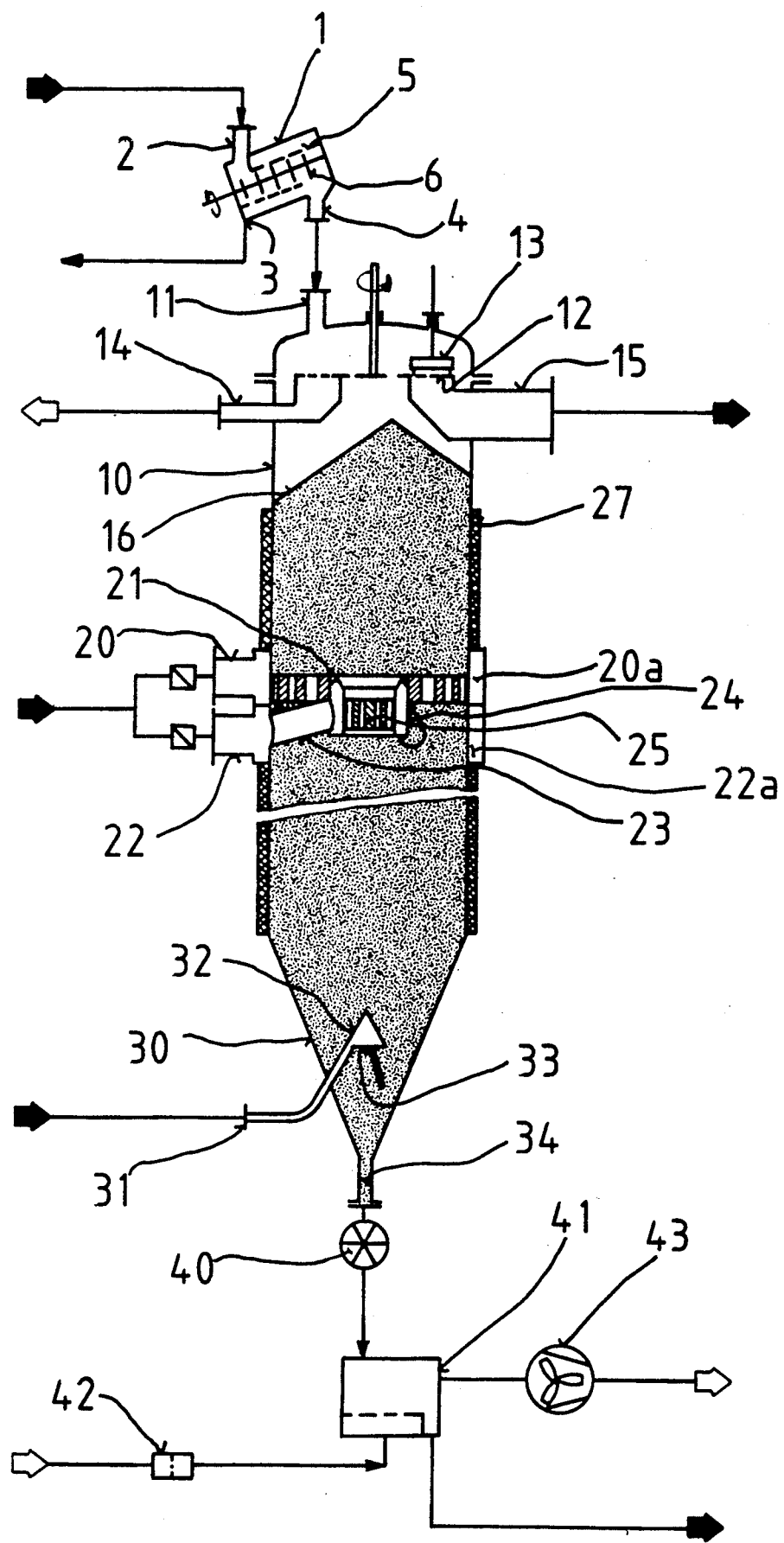

DRYING AND HEATING OF POLYAMIDE GRANULES

BACKGROUND OF THE INVENTION

To classify the invention, the starting point is a known process, described in DE-B-2 530 304, whereby polyamide granules in a suspension in water are freed of water in one operation. The granules are dried and heated in succession in successive zones of a tower dryer with the aid of a countercurrent stream of inert gas at from 70° to 200° C. The heating has the purpose of raising the molecular weight of nylon-6 through postcondensation in the solid phase. The granules slowly pass under the effect of gravity downward through the drying and heating zones and through a heat exchanger and are discharged via a horizontally slidable grill. However, the heat exchanger, which forms an integral part of the tower dryer, and the slidable grill, which gives a batchwise discharge of granules, limit the levels of throughput, and the effects of a nonuniform distribution of the inert gas on the quality of the product are not always avoidable. In addition, the process requires a comparatively high inert gas throughput in relation to the amount of granules discharged.

Furthermore, U.S. Pat. No. 3,266,165 describes a process for drying polyamide granules by first separating off the water in a centrifuge and drying the granules in a tower dryer with countercurrent inert gas. Apart from the fact that polyamide granules already contain dustlike fines from the process of granulation, the mechanical stress in a centrifuge produces further fines. On drying, the fine dust becomes entrained in the inert gas and blinds the filters. Finally, additional expense is necessary to avoid the ingress of oxygen during centrifuging.

SUMMARY OF THE INVENTION

It is an object of the present invention to provide a means for the continuous drying and heating of substantially dustless polyamide granules which sets narrow limits for the residual moisture content and the average molecular weight of the product through post-condensation in the solid phase in the course of short residence times.

In the process according to the present invention, extracted polyamide granules are hydraulically conveyed at from 90° C. to 110° C. with from 3 to 12 kg of water/kg of polymer, separated from the bulk of the water and transported into a tower dryer. The tower dryer contains a drying zone and a heating zone. The granules are separated from the bulk of the water with the aid of a sieve pipe situated above the tower dryer. Thereafter the granules have moisture contents of from about 0.1 to 0.5 kg of water/kg of polymer.

The granules form a layer on a horizontally rotatable sieve ring inside the tower dryer and are subjected to the flow of an inert gas, in general nitrogen. The granules, which now contain less than 0.17 kg of water/kg of polymer, are stripped off and transferred into the drying zone, forming a conical pile. The depth of the bed of granules in the drying zone is kept constant through appropriate control of the rate of discharge at the lower end of the tower dryer. The granules pass through the drying zone and through the subsequent heating zone in plug flow at a speed of less than 0.5 m/h. It is advantageous that the tower dryer, i.e. the entire treatment zone, has a height/diameter ratio of from 6 to 15. The heating zone ends in a conical bin at the lower end of the tower dryer containing a conical displacer. This arrangement ensures a substantially constant residence time of all granules in the tower dryer, so that for example the viscosity number of nylon-6 products is raisable by the heat treatment from 110 to more than 300 (viscosity number based on a solution of 0.5 g of nylon-6 per dl of 96% strength sulfuric acid in accordance with German Standard Specification DIN 53727).

Between the drying zone and the heating zone, i.e. at a point more than about a distance of from 1 to 1.5 times the diameter of the tower dryer beneath the surface of the bed of dumped granules, an inert gas at a temperature of 70°-200° C., preferably 90°-150° C., is passed at a speed of from 2 to 20 m/sec into the bed of granules, the stream of inert gas being divided in such a way that a first stream is introduced radially inward into the bed of granules at a plurality of points along the shell of the tower dryer and that a second stream is passed into the center of the bed and is guided from there radially outward and inward. The inert gas rises upward in the bed at a speed of less than 1 m/sec, is uniformly distributed and thus permits uniform heat and mass transfer processes. In this way it is possible to dry the granules to a moisture content of 0.0001 kg of water/kg of polymer.

The efficiency of the drying process depends essentially on the mass flows of granules and inert gas, the particular temperatures at the inlet and outlet and also on the water content of the granules and the relative humidity of the inert gas. Residual moisture contents of less than 0.05% in the polyamide at equilibrium between the solid phase and the gas phase are achieved with relative inert gas humidities of below 1%. The relative humidity of the inert gas is set by condensing out water and heating the gas under constant pressure. Relative humidities below 1% make it necessary to cool the inert gas from more than 150° C. down to at least 30° C.

The inlet temperature of the nitrogen underneath the drying zone is in general decided as a function of the degree of postcondensation desired in the lower portion of the treatment zone. The temperature in the heating zone is kept constant in accordance with the temperature of the incoming nitrogen. The rate at which the attainable degree of polycondensation is reached on heating increases with the temperature and decreases with the water content of the granules. Raising the molecular weight of extracted nylon-6 granules having a viscosity number of 110 to, for example, viscosity numbers of above 300 generally requires residence times of from 20 to 60 h at from 140° to 190° C. and moisture contents of the granules of below 0.05%. The drying utilizes from 4 to 7 kg of nitrogen per kg of dry polymer at gauge pressures of up to 0.4 bar.

To obtain consistent product properties, the heating time and/or the rate of descent of the granules must be very uniform. The rate of descent is in general from 0.3 to 0.6 m/h. The process achieves relative speed differences $\Delta W^* = (W_{max} - W_{min})/(W_{average}) \times 100$ of less than 4% and products having viscosity numbers within the specified tolerance range. This high degree of uniformity is made possible by a conically tapered area of the tower dryer immediately below the treatment zone.

In this tapered area, the present invention provides for the introduction of a further inert gas stream at a rate of from 0.05 to 0.5 kg of gas/kg of polymer.

The relative humidity of this gas stream may also be smaller than that of the circulating gas introduced into the drying zone, so that the residual water content of the end product may additionally be adjusted in the lower, heating zone.

According to a further feature of the present invention, the granules, after having been discharged from the tower dryer, are cooled with air in a fluidized bed to $<50°$ C. This is done by passing about $2-8 \, m^3/(m^2s)$ of filtered air through the fluidized bed. The pressure in the fluidized bed is lower than in the tower dryer. The residence time of the granules in the fluidized bed is about 1.5–3 min.

BRIEF DESCRIPTION OF THE DRAWING

The drawing shows a diagrammatic view of the apparatus of the invention.

DESCRIPTION OF THE PREFERRED EMBODIMENTS

In essence, the apparatus consists of a sieve means (1) above a tower dryer (10), the tower dryer comprising sieve ring (12), feed lines (20, 22) for the inert gas, conical bin (30) and a discharge means (40), and also a fluidized bed cooler (41).

The granule/water mixture is introduced into the sieve means at (2) and conveyed upward at an oblique angle by a paddle screw (6) into a sieve pipe (5). The transport medium water runs off through connection (3). The granules fall through connection (4) and the input connection (11) onto the rotatable sieve ring (12). With every rotation of the sieve ring the granules on the sieve ring, which comprises two different segments, are first dewatered via the water runoff (14) and then subjected to a downward flow of inert gas. The inert gas rises in the bed (16) of the tower dryer, is deflected above the horizontal sieve ring and is guided away via the gas collection space situated underneath the sieve ring and the outlet (15).

The granules are tossed radially inward via the strip (13) onto the bed of the tower dryer.

The shell of the tower dryer is heat-insulated. The insulation (27) is interrupted in the upper part by two feed lines (20) and (22) for inert gas arranged one above the other as rings around the cylinder wall. The upper feed line (20) channels the gas into a ring line (20a) and passes it through rectangular inlets (21), uniformly disposed along the cylinder wall, radially inward into the bed of granules. The free area of the inlets corresponds to less than 0.7 times the free crosssection of feed line (20). The lower feed line (22) passes inert gas via the ring line (22a) into a distributor ring (24) disposed centrally in the bed. This distributor ring (24) is supported by pipes (23) extending from the inner cylinder wall of the tower dryer (10). The pipes pass the inert gas into a distributor ring (24) and from there radially outward and inward into the bed of granules. The inner ring diameter of the distributor ring is about ⅓ of the inner diameter of the tower dryer and the ring thickness is about ⅓ of the inner ring diameter. The height of the distributor ring is about 2.5 times the ring thickness. The distributor ring (24) ends at the top in a roof shape. The inner and outer shells of the distributor ring are likewise provided with rectangular outlets (25) whose free areas are in total more than 0.7 times smaller than the free cross-section of feed line (22).

The treatment zone of the tower dryer for drying and heating the granules has a diameter $>1$ m, a height $<18$ m and a height/diameter ratio of from 6 to 15.

The treatment zone is followed in the downward direction by a narrow-tapered conical bin (30), the taper being $<45°$, preferably $<25°$. The diameter of the discharge pipe (34) depends on the mass flow of the granules and in general more than 100 mm. The bin contains in its center at approximately midlength a conical formation (32) with the tip pointing upward. The conical formation (32) is supplied via a further feed line (31) with inert gas for distribution via the sieve area (33). In a preferred embodiment, the apex angle of the conical formation (32) is less than 60° and its diameter is about 40% of the bin diameter at that point. The granules are discharged continuously via gates which make it possible to control the mass flow as a function of the fill level of the tower dryer. The granules accumulate in a subsequent fluidized bed cooler (41) on an inclined sieve plate through which air is aspirated via a filter (42) and a fan (43).

The process is illustrated by the following Example:

An apparatus corresponding to the drawing is charged with 1,700 kg/h of extracted nylon-6 granules 2.5 mm $\Phi \times 2.5$ mm in size, viscosity number 170, together with five times the amount of water. The granules are separated in the sieve means (1) from the bulk of the water and arrive with a water content of 0.25 kg of water/kg of polymer and at 98° C. on the sieve ring (12) at the top of the tower dryer (10). The sieve ring eliminates about 120 kg of water/h. The granules, which contain 0.160 kg of water/kg of polymer, fall onto the conical pile in the drying zone of the tower dryer. The two feed lines (20) and (22) supply a total of 7,100 kg/h of nitrogen at 160° C. with a relative humidity of 0.69% or a water content of 0.024 kg of water/kg of $N_2$. The flows through the feed lines (20), (22) are approximately of equal size. Feed line (31) supplies the bin of the tower dryer with 75 kg/h of dry nitrogen at from 10° C. to 30° C. The rate of descent of the granules in the tower dryer is about 0.45 m/h, the rate of ascent of the nitrogen in the granules is 0.4 m/s, and the specific nitrogen flow is 4.7 kg of $N_2$/kg of polymer. The gas leaves in a water saturated state at 55° C. and 1.2 bar via pipe (15). Residence times of 6 h in the drying zone and 35 h in the heating zone produce at the lower outlet 1520 kg/h of polyamide granules having a residual water content of 0.0003 kg of water/kg of polymer. The temperature of the granules is 160° C., and the viscosity number is 251. The granules are then cooled in a fluidized bed cooler (41) to an average temperature of 50° C. under a pressure of 980 mbar. To this end 10,000 kg of air/h are passed through the fluidized bed cooler.

We claim:

1. In a process for drying and heating polyamide granules which comprises freeing a suspension of the granules in water from a major part of the water, depositing the granules and remaining water in bed form in a drying zone of a tower dryer, which tower dryer has a lower, conically tapered area, moving the deposited granules and remaining water in plug form downwardly in the drying zone of the tower under the force of gravity, thereby freeing the granules of the remaining water, passing the dried granules into a heating zone in the form of a bed of granules, and heat-treating the downwardly flowing bed of granules in the heating zone at a temperature from 70° to 200° C., the improvement which comprises (A) dividing an inert gas stream on entry into the tower dryer at a point between the drying zone and the heating zone into (1) a stream which passes radially inward into the bed of granules in the drying zone and (2) a stream which flows radially outward and inward into the bed of granules in the drying zone and (B) passing a further stream of inert gas into the lower, conically tapered area of the tower dryer, and discharging the dried, heated granules from the conical end of the tower dryer.

2. A process as claimed in claim 1, wherein the granules, after discharge from the tower dryer, are cooled in a fluidized bed with air at <50° C.

3. An apparatus for drying and heating polyamide granules, which apparatus comprises a separating means for separating a major proportion of water from a suspension of the granules in water; a tower dryer downstream from the separating means, which tower dryer is an upright cylindrical container having (1) an inlet at the top for a mixture of granules and water, (2) an outlet at the bottom for dry granules, (3) a narrow-tapered conical bin at the bottom, (4) feed lines for inert gas, which feed lines comprise (a) two inert gas supply lines which are mounted on the cylinder wall of the tower dryer, the first line of which ends in a ring line on the wall of the tower dryer and which has a plurality of inlets through the cylinder wall, and the second line of which ends in a distributer ring inside the tower dryer and (b) an inert gas supply line which ends in the narrow-tapered conical bin, and (5) the narrow-tapered conical bin ends in a central conical formation which opens in a downward direction to form the outlet for the granules.

4. Apparatus as claimed in claim 3, wherein the tower dryer is connected to a fluidized bed cooler.

* * * * *